United States Patent [19]
Takamura et al.

[11] 4,450,210
[45] May 22, 1984

[54] CLAD MATERIAL

[75] Inventors: Masayuki Takamura; Kazuo Kurahashi, both of Shizuoka, Japan

[73] Assignee: Nippon Gakki Seizo Kabushiki Kaisha, Japan

[21] Appl. No.: 435,875

[22] Filed: Oct. 21, 1982

[30] Foreign Application Priority Data

Oct. 23, 1981 [JP] Japan ............................ 56-169782

[51] Int. Cl.³ ............................................ B32B 15/01
[52] U.S. Cl. .................................. 428/660; 420/442; 428/680
[58] Field of Search ................... 428/660, 678, 680; 420/442, 457, 458; 148/410

[56] References Cited

U.S. PATENT DOCUMENTS 1,346,190  7/1980  Fahrenwald .................. 420/457

FOREIGN PATENT DOCUMENTS 3036342  4/1981  Fed. Rep. of Germany ...... 428/660

Primary Examiner—Michael L. Lewis
Attorney, Agent, or Firm—Ostrolenk, Faber, Gerb & Soffen

[57] ABSTRACT

In composition of a Ni-Ti type clad material, specified amount inclusion of Cu and Cr in the Ni base metallic sheath assures ideal coordination in annealing suitability and plastic workability between the sheath and the core with enhanced mechanical properties and resistance against corrosion of the product.

4 Claims, 5 Drawing Figures

CLAD MATERIAL

BACKGROUND OF THE INVENTION

The present invention relates to an improved clad material, and more particularly relates to improvement in construction of a Ni-Ti type clad material which includes core and sheath components.

A Ni-Ti type clad material is usually made up of a Ti base metallic core and a Ni base metallic covering or sheath clad to each other. Ti base metal usually has light weight, excellent mechanical strength and high workability whereas Ni base metal has excellent suitability for brazing and plating with beautiful surface luster. Thanks to combination of such advantages of the component metals, Ni-Ti type clad materials are expected to be well used for production of eyeglass-frames, watchbands and other decorative accessories. In practice, however, use of Ni-Ti type clad material for these purposes is enevitably accompanied with several problems.

First, for the above-described usages, the material has to be subjected, after annealing, to plastic works such as rolling and drawing, mechanical works such as griding, brazing and plating. In connection with these works, however, Ni-Cr alloys used for the Ni base metallic sheath is usually poor in plastic workability. In order to enable cladding with the Ti base metallic core and subsequent plastic works, the Ni-Cr alloys have to be subjected to annealing at temperatures of 600° C. or higher. Heating at such high temperatures generates inter-metallic compounds such as $Ti_2Ni$, $TiNi$ and $TiNi_3$ at the boundary between the core and the sheath, which cause separation between the two components and lowering in brazing strength.

Next, sole use of Ni for the sheath enables annealing at relatively low temperatures, thereby successfully avoiding the above-described problem of inter-metallic compound. However, the too soft and ductile nature of Ni results in predominant stretch of the Ni sheath, when compared with behavior of the Ti core, during the plastic deformation, in particular at drawing, thereby causing disorder in clad ratio and/or seizure to drawing dies. Further, in rolling for square rods, the easy stretch of the Ni sheath disenables correct production of square rods as designed, or to say the least, neccessitates difficult and complicated control of the rolling conditions.

SUMMARY OF THE INVENTION

It is the object of the present invention to remove the above-described disadvantages inherent to the conventional Ni-Ti type clad materials.

In accordance with the basic aspect of the present invention, Ni base alloy including small amount of Cu and Cr is used for the sheath or covering. More specifically, the clad material in accordance with the present invention comprises a Ti base metallic core clad with Ni base metallic covering which includes 75 to 98% by weight of Ni, 0.5 to 20% by weight of Cu and 0.1 to 5% by weight of Cr.

DESCRIPTION OF THE PREFERRED EMBODIMENTS

Not only pure Ti but also alloys including Ti as the major component is used for the sheath or covering of the clad material in accordance with the present invention. Such Ti base alloys includes Ti with one or more of Al, V, Mn, Fe, Cu, Mo, Cr and W. Preferably, the content of Ti in the alloy should be 90% by weight or larger. When the content of Ti falls short of 90% by weight, no sufficient plastic workability can be expected and, depending on the sort of other component to be added, its characteristics as a light metal is lost.

The Ni base alloy for the sheath includes 0.5 to 20% by weight of Cu and 0.1 to 5% by weight of Cr. One typically preferable Ni base alloy includes 85 to 98% by weight of Ni, 0.8 to 10% by weight of Cu and 0.1 to 5% by weight of Cr.

By inclusion of Cu, the Ni base alloy can possess plastic workability which is roughly equal to that of the Ti base alloy for the core even when annealing is carried out at temperatures lower than 600° C. without generation of the undesirable inter-metallic compound. When the content of Cu falls short of 0.5% by weight, no appreciable rise in plastic workability can be expected. Whereas any content of Cu exceeding 20% connects to poor resistance against corrosion and low workability. More preferably, the content of Cu should be in a range from 1 to 10% by weight.

Addition of Cr enhances hardness, springy nature and resistance against corrosion of the Ni base alloy for the sheath, making its work hardening characteristics close to those of the Ti base core. The content of Cr is in a range form 0.1 to 5% by weight, and more preferably from 0.5 to 3% by weight. No significant effect can be observed when the content of Cr falls short of 0.1% by weight and any content above 5% by weight would connect to a corresponding rise in the annealing temperature which cause generation of the undesirable inter-metallic compounds.

Various known methods are employable for production of the Ni-Ti type clad material in accordance with the present invention. In one method, a Ti base alloy plate is sandwiched by a pair of Ni base alloy plates and the combination is subjected to hot rolling. In particular for production of a Ni-Ti type clad material to be used for eyeglass-frames, a cylindrical body made up of a Ti base metallic core and a Ni base metallic sheath is subjected to hot extrusion, hot drawing or hot rolling. It is also employable to subject an annealed material to hot or cold extrusion, drawing or rolling.

Annealing is carried out in an environment of non-oxidizable gas such as Ar, N, or H, at a temperature in a range from 480° to 560° C. for 10 to 20 min. After annealing, the material is subjected to further processes such as plastic works, mechanical works, brazing and plating.

Figure 1:
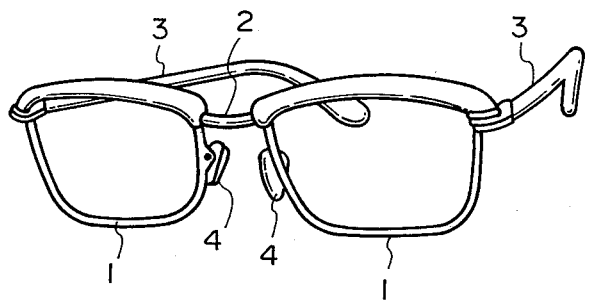
FIG. 1 is a perspective view of an eyeglass-frame for which the clad material in accordance with the present invention is advantageously usable.

Eyeglass-frames are one typical example for which the Ni-Ti type clad material in accordance with the present invention is most advantageously used. One example of such an eyeglass-frame is shown in FIG. 1, in which the eyeglass-frame includes a pair of rims 1 each holding a lense, a bridge 2 connectings the rims 1, a pair of bows 3 extending rearwards from the associated rims 1, and pads 4 attached to the facing fringes of the rims 1.

A rod shaped or hollow cylindrical clad material is first subjected to heating in a non-oxidizable gas environment for annealing purposes. High-frequency induction heating is advantageously employed for local heating. Next the annealed clad material is subjected to cold or hot drawing or extrusion in order to obtain a clad wire material. The hot process is usually carried out at a temperature in a range from 450° to 500° C. By properly changing the shape of the die or applying rolling or compaction, clad materials of various specified cross sectional profiles may be produced.

The clad material so obtained is then subjected to necessary bending and/or grinding in order to form the above-described parts of an eyeglass-frames. These parts are finally assembled together by brazing or attachment of hinge joints. Precious metal plating may further be applied to in order to provide the eyeglass-frame with luxurious impression.

In accordance with the present invention, a Ti base metallic core is combined with a Ni base metallic sheath of a specified composition in order to well coordinate annealing suitabilities and plastic workabilities of both materials and the clad material obtained acts as a light metal provided with excellent mechanical properties and high resistance against corrosion.

Figure 2:
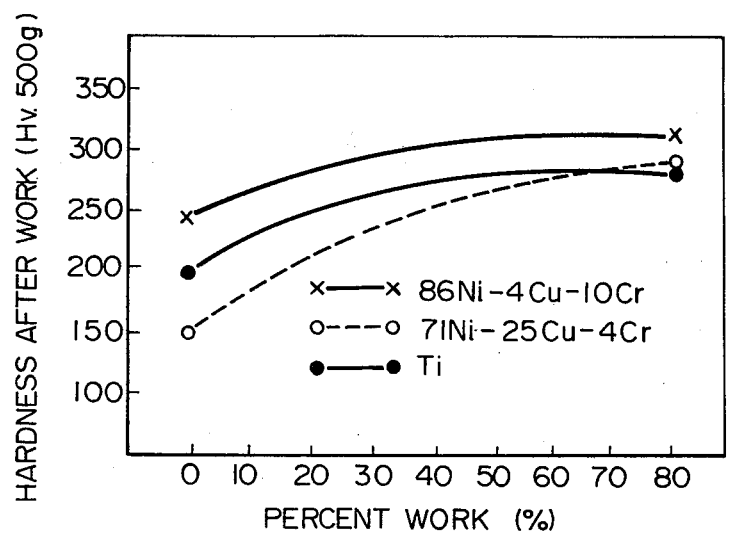
FIG. 2 is a graph for showing deviation in hardness after working of Ni base alloys for the sheath falling outside the present invention from Ti for the core.
Figure 3:
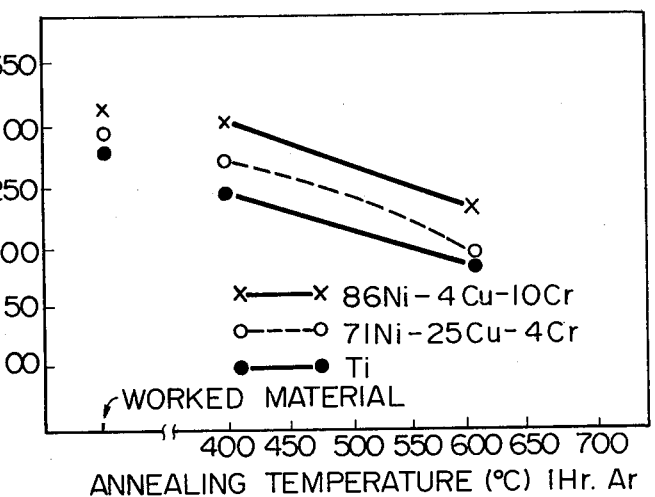
FIG. 3 is a graph for showing deviation in hardness after annealing of Ni base alloys for the sheath falling outside the present invention from Ti for the core.

The experimental data shown in FIGS. 2 and 3 well warrant the above-described statement. In the illustration, two sorts of Ni base metallic sheath falling outside the present invention are shown in comparison with a Ti base metallic core regarding their hardness after work and annealing. The curve (X—X) is for a Ni base metallic sheath with excessive Cr in which 86% by weight of Ni is combined with 4% by weight of Cu and 10% by weight of Cr. The curve (●—●) is for a Ti metallic sheath. The curve (o----o) is for a Ni base metallic sheath with excessive Cu in which 71% by weight of Ni is combined with 25% by weight of Cu and 4% by weight of Cr. It is apparently learnt from these data that excess in content of any additional components causes clear deviation in mechanical qualities of the resultant Ni base metallic sheath from those of the Ti base metallic core and such deviation naturally results in poor coordination between the two components making up the Ni-Ti type clad material.

DESCRIPTION OF EXAMPLES

EXAMPLE 1

Pure Ti, pure Ni, a Ni base alloy for the sheath (95Ni-4Cu-1Cr) in accordance with the present invention, a typical conventional Ni base alloy (90Ni–10Cr) were used for comparison. From these materials rods of 20 mm. diameter with 1000 mm. length were prepared and subjected to annealing at 500° C. for 1 Hr. in Ar environment. After annealing, the rods were subjected to drawing at percent work from 10 to 80%. The percent work is given by (So-S1)/So×100 provided that So represents the transverse cross sectional surface area before the drawing and S1 represents the transverse cross sectional surface area after the drawing.

Figure 4:
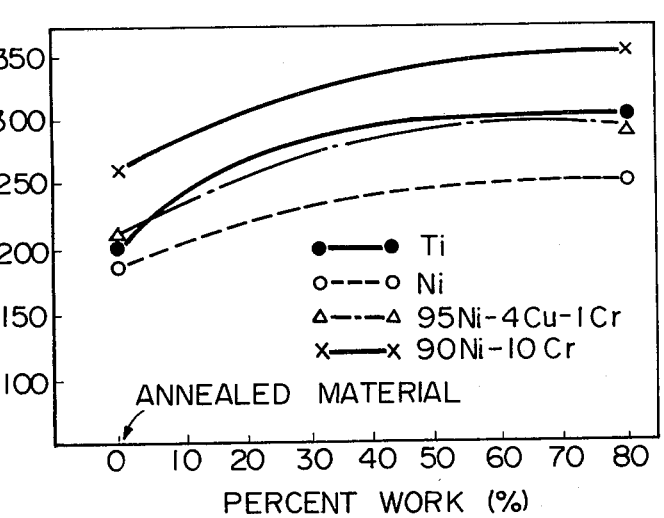
FIG. 4 is a graph for showing the relationship between percent working and hardness after work for various materials prepared in one Example of the present invention.

Vickers hardness for the rod of each material after drawing is shown in FIG. 4 over various percent work in comparison with that after annealing.

Figure 5:
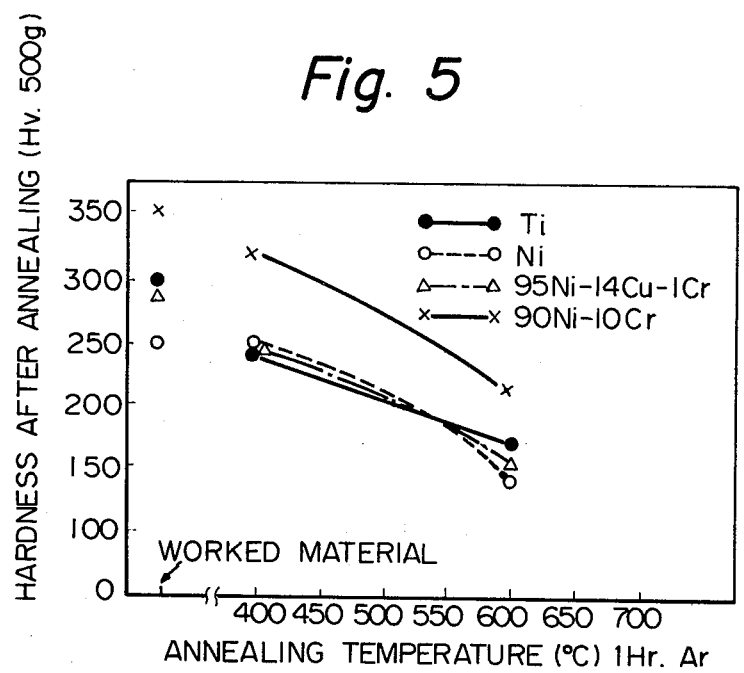
FIG. 5 is a graph for showing the relationship between annealing temperature and hardness after annealing for various materials prepared in the above-described Example of the present invention.

After drawing, each rod of 80 percent work was subjected to further annealing at 400° to 600° C. for 1 Hr. within Ar environment. Vickers hardness for each rod after annealing is shown in FIG. 5 over various annealing temperatures in comparison with that after the drawing.

The results shown in the drawings well indicates that the Ni-Cu-Cr alloy for the sheath in accordance with the present invention has work and annealing characteristics very close to those of Ti for the core.

EXAMPLE 2

A pure Ti rod (core) of 50 mm. diameter and 1000 mm. length was ground on the outer surface and inserted into the ground axial bore of a 95Ni-4Cu-1Cr alloy tube (sheath) of 55.5 mm outer diameter, 2.7 mm. thickness and 1000 mm length. An iron tube of 70.5 mm. outer diameter and 7.3 mm. thickness was coated on the inner surface with alumina powder for easy separation and inserted over the above-described alloy tube embracing the Ti rod. The combination was subjected to drawing with a die of 70.0 mm. inner diameter. Annealing at 500° C. for 1 Hr and wire drawing were alternately repeated 10 times in order to obtain a clad wire material of 2.6 mm. outer diameter. The sheath ratio in the trasverse cross sectional area was 20%.

Same preparation was carried out using pure Ni and 90Ni-10Cr alloy and three types of clad materials were obtained.

Each clad material was subjected to annealing at 500° C. for 1 Hr, to drawing down to 2.0 mm. outer diameter using spindle oil for lubrication, and to swaging down to 1.5 mm. outer diameter.

The extent of seizure of the clad materials at the wire drawing and the extent of thickness deviation were measured and are listed in Table 1.

TABLE 1

| Sheath material | Seizure* in % | Thickness deviation** in % | Remarks |
|---|---|---|---|
| Ni | 83 | 36 | comparative example |
| 90Ni-10Cr | 5 | 14 | Comparative example with a lot of separation |
| 95Ni-4Cu-1Cr | 0 | 15 | Example of the invention |

*The extent of seizure is represented by percent occurance of seizure at wire drawing
**The extent of thickness deviation is given by the following formula.
(Max. thickness − min. thickness)/max. thickness × 100

By application of pressing, each clad wire material of 1.5 mm. diameter was deformed into a flat strap of 0.7 mm. thickness and 3.2 mm width. One end of the strap was fixed and a load was applied to a point 100 mm. distant from the fixed end until the strap bent over 50 degrees. After removal of the load, the angle of deflection $\theta$ was measured in order to calculate its spring value as follows, and the results obtained are shown in Table 2.

Spring value = $(50-\theta)/50 \times 100$

TABLE 2

| Sheath | Surface occupy ratio of sheath in % | Spring value |
| --- | --- | --- |
| Ni | 18 | 36 |
| 95Ni-4Cu-1Cr | 18 | 52 |

We claim:
1. An improved clad material comprising
a Ti base metallic core, and
a Ni base metallic covering clad to said Ti base metallic core and including 75 to 98% weight of Ni, 0.5 to 20% by weight of Cu and 0.1 to 5.0 by weight of Cr.

2. An improved clad material as claimed in claim 1 in said Ti base metallic core includes at least 90% by weight of Ti.

3. An improved clad material as claimed in claim 2 in which
said Ti base metallic core further includes at least one component chosen from a group consisting of Al, V, Mn, Fe, Cu, Mo, Cr and W.

4. An improved clad material as claimed in claim 1, 2, or 3 in which
said Ni base metallic covering includes 85 to 98% by weight of Ni, 0.8 to 10% by weight of Cu and 0.1 to 5% by weight of Cr.

* * * * *